Figure 1:
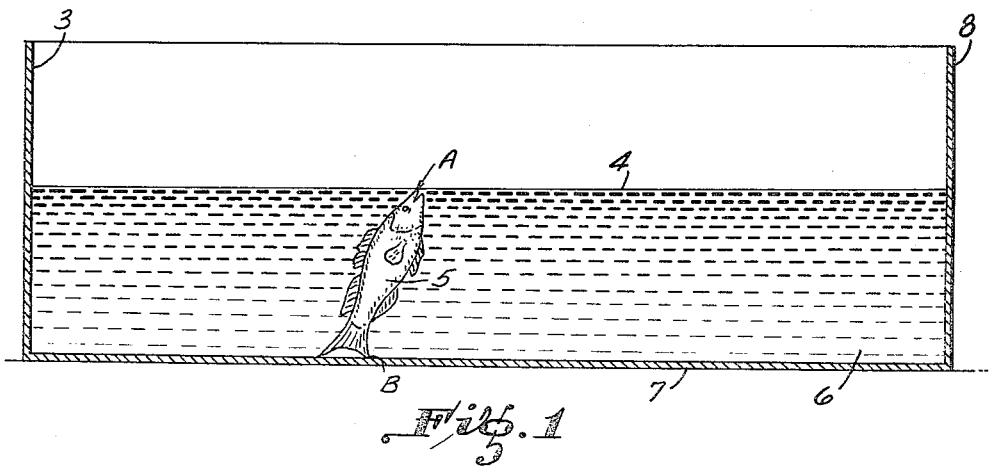

June 21, 1960  R. M. BROWN  2,941,503

METHOD FOR HOLDING AND SHIPPING LIVE FISH

Filed Oct. 30, 1956

ROYCE MILTON BROWN
INVENTOR

By Irving Lichtenberg
ATTORNEY

United States Patent Office 2,941,503
Patented June 21, 1960

2,941,503

METHOD FOR HOLDING AND SHIPPING LIVE FISH

Royce Milton Brown, P.O. Box 752, Albuquerque, N. Mex.

Filed Oct. 30 1956, Ser. No. 619,209

1 Claim. (Cl. 119—3)

This invention relates to a method of supplying natural atmospheric oxygen to live fish and is adaptable to transporting and storing only. This application is a continuation-in-part of my prior application Serial Number 575,654 now abandoned.

Prior to this invention no practical simple workable means had been found by which live fish could be supplied with natural atmospheric air without resorting to such devices as agitation for the water or air pumps to pump air into the water, and many other means and methods which are excellent for the purpose for which they are intended but due to their particular construction or method of operation render them unadoptable to all types of fish shipping.

I have discovered a method whereby the aforementioned requisites may be disregarded without ill effects on the fish.

It is therefore the primary object of this invention to provide a novel simple workable method for keeping fish alive and in a healthy condition for considerable periods of time.

A further and particular advantage of this invention is its adaptability to regular and usual types of containers.

Another objective of the invention is to provide a method for transporting and storage of live fish in water that requires no separate oxygen supply for the water and necessitates no water change.

Another advantage of the invention is its ease of application to all phases of fish shipping without special equipment.

Other advantages of the invention will become apparent as the following description proceeds.

The method of the present invention in essence constitutes placing fish in a position where they can use the dissolved oxygen that is present on the surface of water. Water that is exposed to open air always has a sheet of dissolved oxygen on its surface. This sheet of dissolved oxygen is unexhaustible as long as oxygen remains in the air. Ordinarily fish do not have the ability to make use of this sheet of dissolved oxygen. A reason for this is that fish are usually in deep water. They are well below the top oxygen. When the oxygen contents of the main body of water becomes reduced to a point where the contained fish are in need of additional oxygen they move toward the surface of the water. True there is dissolved oxygen in abundance for the fish in the sheet of dissolved oxygen on the water surface. However the fish cannot use this oxygen successfully because they cannot support themselves in a position to do so. Their efforts to maintain their position at the water surface is considerable, they become exhausted from their efforts, they sink into the oxygen depleted water of the container and die.

Therefore in carrying out my new method, the desired number of fish of near the same length are placed in a container, water is now added to the container until a depth is reached which is just about the depth of the length of the fish. These fish are now processed and are in a position where they have available to them all the dissolved oxygen they need. The principle proceeds in this manner. When the fish in container are in need of additional oxygen they will rise to the surface, in this position the fish are in a sort of upright position. Their tails are against the floor of the container and their mouth is near the water surface. They can remain in this position easily because they have a brace or support. They actually use their tail as a sort of foot. This applies to a container that is near level and has fish of near the same length.

To use this method with fish of varied lengths it is necessary to set the container out of level so that the fish can find their respective depth according to their length.

Fish that are of a varied length and if the variation isn't too great and if the container is being moved can be placed in water having a level depth. The water can be of a depth about equal to the length of the shorter fish. The nature of a moving vehicle which if ever level is accidentally so, and then not for long. This movement of the conveying vehicle constantly changes the water depth, amounting to the same thing as setting the container out of level while stationary.

In carry out this method 200 minnows having body lengths of from 2 inches to 4 inches were kept in an out of level container 16 x 16 inches square for a period of time up to 72 hours without the loss of any fish, and without apparent ill effects to the fish. These same fish were used many times in over a period of several months without undue loss. Other fish of the same length and different lengths have been used in level and unlevel containers while being moved or being stationary for equal or longer periods without undue loss, and with no apparent ill effect on the fish. Fish have been transported 400 miles and left in storage 24 hours and were still in good condition.

To avoid spilling of water due to movement of the conveyer or otherwise, the container can be closed and if necessary sealed. All that is necessary is to allow sufficient space above the water surface to supply oxygen to the water while the container is closed.

For further understanding of the method and its objective, and advantages reference will be had to the following descriptions and accompanying drawings, and to the claim in which the various novel features of the method are more particularly set forth.

Figure 1 is a drawing showing the position of the contained fish in relation to the depth of water. In this case the container is set level. The one fish shown is for clarity of detail and represents more than one fish of near the same length.

Figure 2:
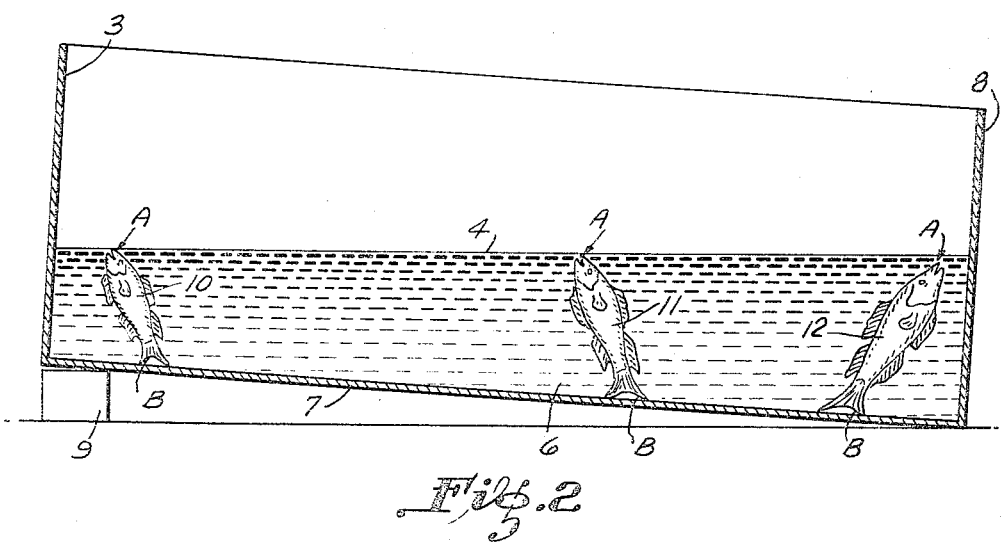

Figure 2 is a drawing showing fish of different lengths within a container. This container is rendered out of level by an object placed under one side. These fish are shown in their respective position in relation to their length and the water depth.

Refer now to the accompanying drawing in detail wherein like reference numerals are utilized to designate similar parts throughout the various views. The numeral 3 designates a container suitable to confine fish therein. 4 is the water surface and shows container set level and fish 5 of near the same length in relation to the water depth. At the water surface 4 is dissolved oxygen, even though the main body of water is depleted of oxygen. This drawing shows fish 5 in position to receive and use this top oxygen. It shows their tails against floor of container 3 at Point A and their mouths near water surface 4 at Point B. 6 is main body of water which for explantory purposes is without sufficient oxygen to support fish life. 7 is floor of container 3. 8 is side wall of container 3. 9 is an object such as a block and is for the purpose of elevating one side of container 3 to set container 3 out of level for the purpose of creating varied depths of water within the container. 10—11—12 are fish of different lengths and are shown in their respective places within the different depth of water.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claim.

I claim:

The method of maintaining fish in a live healthy condition while being held in temporary storage, or while being transported, comprising immersing the fish in water having a depth ranging from that equal to the fish's total length to a depth slightly less than the fish's total length, and exposing the water surface to open air.

References Cited in the file of this patent

UNITED STATES PATENTS

| | | |
|---|---|---|
| 68,871 | Green | Sept. 17, 1867 |
| 2,652,807 | Washburn | Sept. 22, 1953 |
| 2,680,424 | Brown | June 8, 1954 |